OR 3,253,260

JWC

May 24, 1966 J. S. HAWLEY 3,253,260

DIGITAL DATA SYSTEM AND APPARATUS

Filed Aug. 31, 1961 8 Sheets-Sheet 1

INVENTOR.
Jack S. Hawley
BY Fisher & Swain
Attorneys

May 24, 1966 J. S. HAWLEY 3,253,260

DIGITAL DATA SYSTEM AND APPARATUS

Filed Aug. 31, 1961 8 Sheets-Sheet 2

INVENTOR.
Jack S. Hawley
BY
Fleher and Swain
Attorneys

INVENTOR.
Jack S. Hawley
BY Fleha (and) Swain
Attorneys

INVENTOR.
Jack S. Hawley
BY Fleh[r] and Swain
Attorneys

INVENTOR.
Jack S. Hawley
BY Fleher and Swain
Attorneys

DIGITAL DATA SYSTEM AND APPARATUS

Filed Aug. 31, 1961 8 Sheets-Sheet 6

INVENTOR.
Jack S. Hawley
BY Fleh Conn Swain
Attorneys

DIGITAL DATA SYSTEM AND APPARATUS

Filed Aug. 31, 1961 8 Sheets-Sheet 7

INVENTOR.
Jack S. Hawley
BY [signature]
Attorneys

May 24, 1966 J. S. HAWLEY 3,253,260

DIGITAL DATA SYSTEM AND APPARATUS

Filed Aug. 31, 1961 8 Sheets-Sheet 8

INVENTOR.
Jack S. Hawley
BY
Fleh[?] and Swain
Attorneys

United States Patent Office 3,253,260

Patented May 24, 1966

3,253,260

DIGITAL DATA SYSTEM AND APPARATUS

Jack S. Hawley, Berkeley, Calif., assignor, by mesne assignments, to Berkeley Instruments, Emeryville, Calif., a partnership Filed Aug. 31, 1961, Ser. No. 135,295
24 Claims. (Cl. 340—151)

This invention relates to a digital data system and more particularly to a digital data system which is adapted for use in the collecting of data from different types of sources.

It has been difficult to provide an integrated digital data system from components which are presently on the market because the transducers are of many different types and do not have a common output. Digitizing means provided for operating with such transducers have generally been so expensive and have such high accuracy and resolution that they can only be justified at a central location. This necessitates the collection of data from the various analog transducers in analog form and then digitizing the same at a central location. Because the analog outputs of these various transducers are very different, apparatus must be provided to provide a common electrical signal to supply to the central digitizing unit. Achieving the desired accuracy dealing with such analog signals is quite difficult particularly in view of the fact that it is often necessary to extend low level signals leads for great distances through electrically noisy areas. It is also necessary to insert switch contacts in these low level leads in order to share the central digitizing unit which compounds the problem. There is, therefore, a need for a new and improved digital data system.

In general, it is an object of the present invention to provide a digital data system and apparatus which overcomes the above named disadvantages.

Another object of the invention is to provide a digital data system and apparatus of the above character in which measuring devices of a broad range of types are used and in which digitizing means is provided for each of the measuring devices to provide an output from each of the measuring devices which is in a common language.

Another object of the invention is to provide a digital data system and apparatus of the above character which makes it possible to use substantially conventional measuring devices.

Another object of the invention is to provide a digital data system and apparatus of the above character in which the signals can be transmitted over relatively low quality transmission lines.

Another object of the invention is to provide a digital data system and apparatus of the above character which is particularly adapted for use with shaft position and shaft velocity measuring devices.

Another object of the invention is to provide a digital data system and apparatus of the above character which has a relatively simple central logic unit.

Another object of the invention is to provide a digital data system and apparatus of the above character which has particularly unique digitizing means connected to each of the measuring devices.

Another object of the invention is to provide a digital data system and apparatus of the above character in which the digitizing means places no load upon the measuring device.

Another object of the invention is to provide a digital data system and apparatus of the above character in which a cascaded decimal counting unit is provided with error indicating means.

Another object of the invention is to provide a digital data system and apparatus of the above character in which the output of the decimal counting units is in a ten-line code.

Another object of the invention is to provide a digital data system and apparatus of the above character in which the output from the decimal counting units can be readily supplied to a visual read-out, or through a code conversion matrix to be supplied to different types of recording or registration equipment.

Another object of the invention is to provide a digital data system and apparatus of the above character in which the error indication means is fully compatable with the ten line numeric output so that it constitutes an eleventh line.

Another object of the invention is to provide a digital data system and apparatus of the above character in which the output of the decimal counting unit digits may be read either simultaneously or sequentially or in combination as required by a specific system.

Another object of the invention is to provide a digital data system and apparatus of the above character which is relatively simple and economical.

Another object of the invention is to provide a digital data system and apparatus which can operate on very low power and in fact can be operated on batteries alone.

Additional objects and features of the invention will appear from the following description in which the preferred embodiments are set forth in detail in conjunction with the accompanying drawings.

Referring to the drawings.

*General description*

In general, my digital data system and apparatus consists of a plurality of devices which are utilized for measuring certain parameters which can be called a measurand such as temperature, pressure, speed, time, position, etc., and provide a physical output which is in the form of a shaft position, a shaft velocity, a sequence of pulses, an unknown resistance, etc. so that each device produces a physical output which represents the measurand that was measured. Digitizing means is connected to each of the devices for translating the phyical quantity into a plurality of pulses or signals. A logic unit which is provided with initiate means also forms a part of the system. Selecting means is provided for connecting the logic unit to the digitizing means of a selected device. The logic unit includes means upon operation of the initiate means in the logic unit for sending an interrogate signal from the logic unit to the digitizing means of the selected device to cause operation of the digitizing means. The digitizing means includes means for sending out a start pulse, a sequence of information pulses representing the physical quantity supplied by the measuring device connected to the digitizing means and a stop pulse to the logic unit. Cascaded decimal counting units are utilized for totalizing the received information pulses and additional means is provided for translating the received totalized information pulses into the desired form so that they can be supplied to a visual read-out, or so they can be telemetered or supplied to conventional recording equipment.

Figure 1:
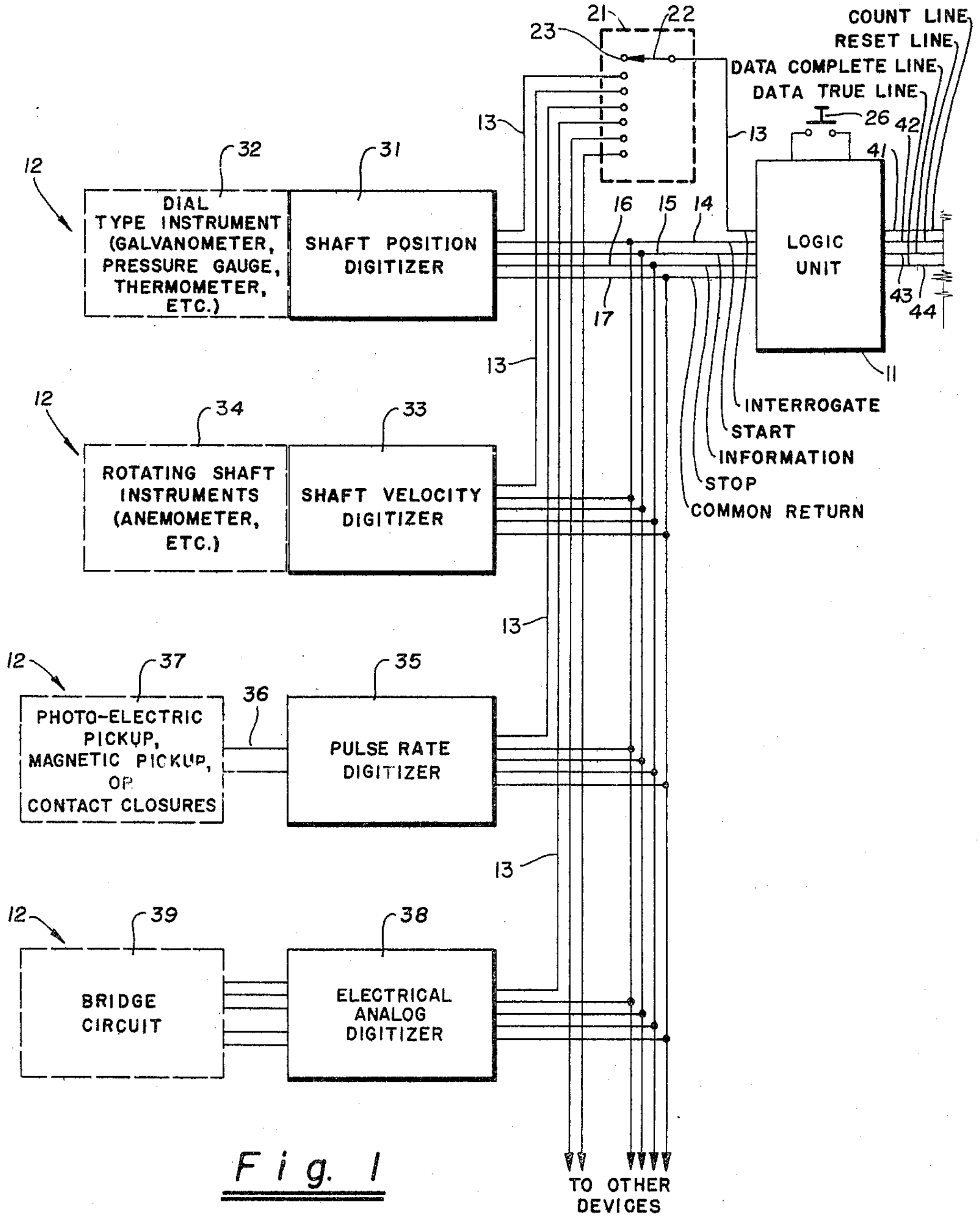
FIGURE 1 is a block diagram of a system incorporating my invention.

As shown in FIGURE 1, my digital data system and apparatus consists of a central logic unit 11 which is connected to a plurality of different types of devices 12. The devices 12 are connected in parallel to the logic unit 11 by five lines or conductors 13–17 which can be identified as shown in the drawing as interrogate line, start pulse line, information pulse line, stop pulse line and common return line, respectively. All of the lines are connected directly to the device 12 with the exception of the interrogate line 13 which is connected through selecting means which can take any suitable form such as a manual selection device 21 which is provided with a wiper 22 adapted to engage a plurality of contacts 23 connected to the interrogate lines of the respective devices 12.

My system and apparatus is not a continuous monitoring system but actually is an interrogate system in which an interrogating signal is supplied on the line 13 to the device selected by the selecting means 21 upon operation of suitable initiating means such as a manual push button 26 provided on the logic unit 11. Initiating means also can take the form of an electrical signal which can be supplied manually or automatically to the logic unit 11 to start the operation of the system.

The devices 12 are of different types, as shown in the drawing but are similar in the fact that they have an output language which is common to all of the devices which is supplied to the logic unit as hereinafter described. As explained previously the devices include means for measuring a measurand which is a physical quantity, property or condition which is to be measured. Thus, the measurand can include temperature, pressure, wind velocity, etc. The measuring means produces a physical output which can be a shaft position, a shaft velocity, a rate of pulses, etc. The devices also include digitizing means connected to the measuring means which translates the physical output into the common language of a plurality of output pulses.

The device 12 shown in the uppermost portion of FIGURE 1 of the drawings consists of a shaft position digitizer 31 which is adapted to be utilized with any type of measuring instrument 32 which gives its output in the form of a shaft position such as conventional dial reading type instruments such as galvonometers, pressure gauges, thermometers, etc.

Another of the devices 12 consists of a shaft velocity digitizer 33 which is adapted to be utilized with any measuring instrument 34 of the type which gives its output information in terms of a rotating shaft such as an anemometer, a speedometer, etc.

Another device 12 shown in FIGURE 1 consists of a pulse rate digitizer 35 which is adapted to be connected by an electrical connection 36 as shown to any type of measuring apparatus 37 which has an electrical output in the form of pulses. These pulses are translated by the pulse rate digitizer 35 into a common language which can be utilizer by the logic unit 11.

Another of the devices 12 consists of an electrical analog digitizer 38 which is adapted to be connected to other circuitry represented at 39 which represents an unknown electrical analog quantity to be measured such as an unknown resistance or voltage in a Wheatstone bridge arrangement to provide the desired information in the common language which can be accepted by the logic unit 11.

It should be apparent from the foregoing that any number of devices 12 can be utilized and connected in parallel to the logic unit 11 as shown in FIGURE 1. There is no interference between the outputs of the devices 12 because isolating diodes (not shown) are provided in the devices in the lines 14, 15 and 16. It is merely necessary that the selecting means 21 be provided with additional contacts so that an individual selection can be made of the different devices. It is also apparent that, if desired, different types of digitizers can be provided. The only requirement is that the output of the digitizer be in the common language which can be accepted by the logic unit 11.

Figures 1A, 1B:
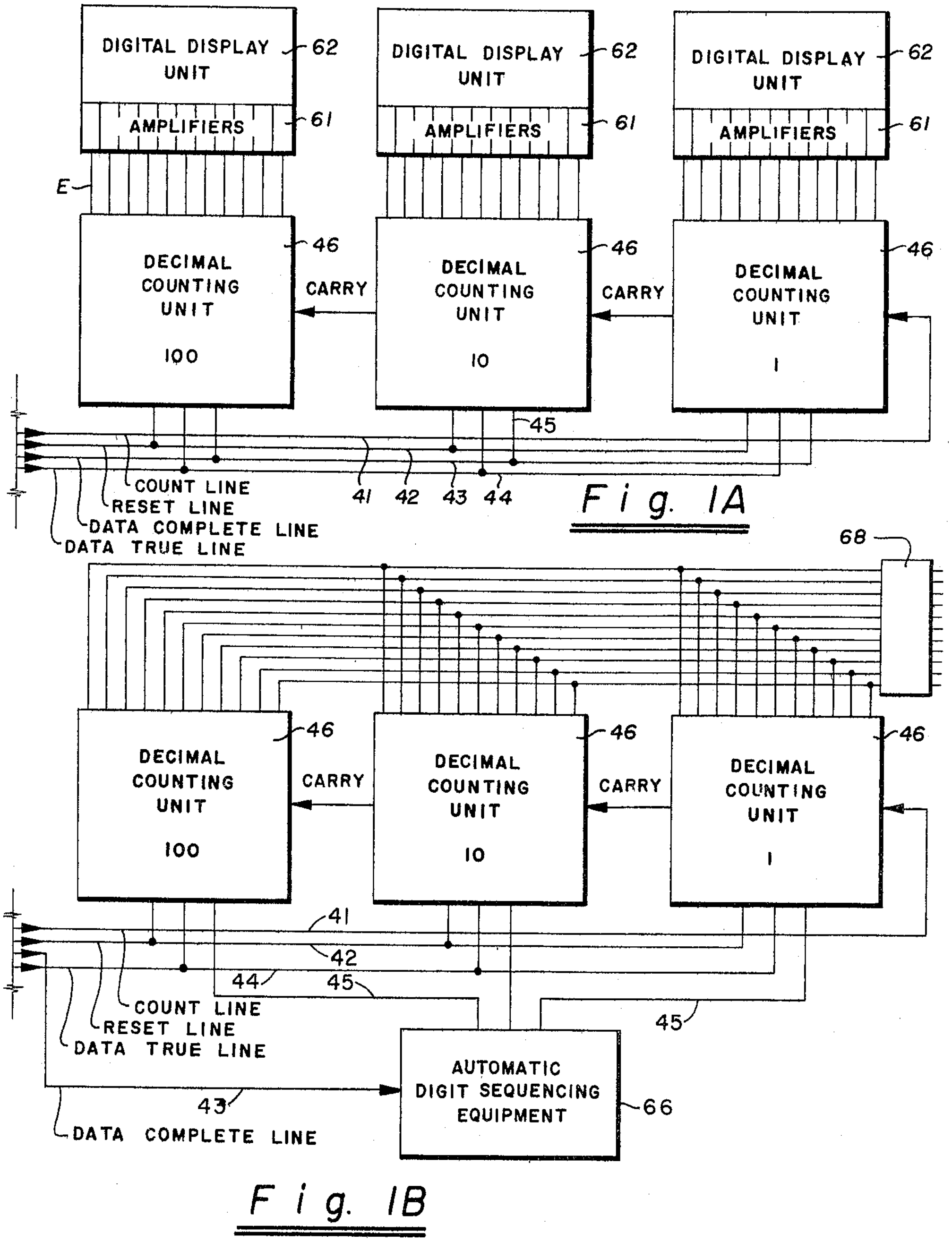
FIGURE 1A is a block diagram of counting means consisting of a plurality of decimal counting units connected to a visual read-out for use with the portion of the system shown in FIGURE 1.
FIGURE 1B is a block diagram of similar counting means consisting of a plurality of decimal counting units connected in parallel and adapted for use with the portion of the system shown in FIGURE 1.

The output of the logic unit 11 is connected to four lines 41–44 which may be designated as the count line, the reset line, the data complete line, and the data true line respectively, as shown in the drawing. As shown in FIGURE 1A, these lines are connected to a plurality of parallel electronic decimal counting units 46. As many decimal counting units as required may be provided. For example, as shown in the drawing, it may be desirable to provide three such units in which the first unit would count the units or ones up to 9 with a carry pulse being provided on the tenth unit to the 10's decimal counting unit; the second unit, the tens up to 90, etc. to make a possible maximum count of 999 with three of the decimal counting units.

As can be seen from the drawing, the count line 41 is connected to the units decimal counting unit which has a conventional carry line to the tens unit. The tens unit has a conventional carry line to the hundreds unit. The reset line 42 is connected to all of the decimal counting units, for resetting the decimal counting units as hereinafter described. The data complete line 43 is connected to the decimal counting units and is used to initiate the interrogation of the decimal counting units after the information is complete.

Each of the decimal counting units is provided with 11 output lines with ten of the lines representing the digits from 0 to 9, and the eleventh line representing an error or E line. Each of these lines is connected to an amplifier 61 which is utilized for driving conventional display units such as the projected image display units 62 shown in the drawing.

The data true line 44 is connected to each of the decimal counting units 46 and permits the information to be read out from the decimal counting units when the information is correct or causes an error light to be lit when there is an error.

In FIGURE 1B, I have shown the decimal counting units 46 connected in a serial manner rather than in the parallel manner shown in FIGURE 1A. In this embodiment, the data complete line 43 is connected to an automatic digit sequencing means 66 for the purpose of initiating an automatic serial readout from the decimal counting units. In a typical embodiment, the automatic sequencing equipment would be related to the print-out device.

When the decimal counting units are connected serially as shown in FIGURE 1B, it is not necessary to provide amplifiers for each decimal counting unit. The 11 output lines of each of the decimal counting units are connected in parallel as shown to a diode encoding matrix 68. The diode encoding matrix 68 can be of any suitable type to provide the desired code required by the equipment into which the coded information is to be fed. If desired, suitable amplifier and isolating diodes (not shown) may be connected in each of the lines. The output from the diode encoding matrix provides a coded output in the desired language which is supplied after being amplified to conventional digital recording equipment such as tape punches, "Flexowriters," Teletype transmitters, etc.

If desired, the diode encoding matrix 68 can be eliminated and the lines directly connected through amplifiers to a solenoid-operated typewriter, or adding machine type printer.

Figure 2:
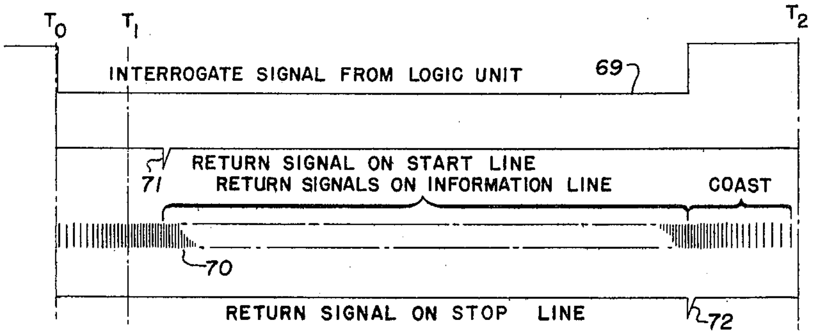
FIGURE 2 is a chart showing the various types of signals utilized in my system and apparatus and the time relationship between the same.

The operation of the system and apparatus as shown in block diagram form in FIGURE 1 may now be briefly described as follows. Upon operation of the initiate push button 26, the logic unit 11 supplies a signal 69 on the interrogate line through the selector means 21 to the selected device 12 which, for example, can be assumed to be the topmost device shown in FIGURE 1. This interrogate signal serves to interrogate the device and starts it through an operating sequence. After the interrogate signal, there is a short delay during which the logic unit 11 ignores any incoming information so that the device 12 has an opportunity to arrive at its operating speed. This is represented by the time between $T_0$ and $T_1$ shown in FIGURE 2. Thereafter, the logic unit 11 receives the information pulses 70 which are supplied by the shaft position digitizer on the line 15. However, information is not recorded by the decimal counting units until a start pulse 71 is received by the logic unit 11 on the start line 14. The cascaded decimal counting units 46 are then gated on and totalize the information pulses which are received on the information line 15 and continue to do so until a stop pulse 72 is generated by the shaft position digitizer 31. This sequence is shown in FIGURE 2. The stop pulse closes the counter gates and causes a data complete signal to be produced by the logic unit, which data complete signal is utilized for operating the automatic digit sequencing equipment 66 as shown in FIGURE 1B. As explained previously, the information recorded in the decimal counting units can be displayed visually or it can be supplied through a suitable diode encoding matrix 68 to supply a properly encoded signal to conventional recording equipment.

Should these events fail to occur within a specified time, an error signal is generated as hereinafter described to indicate that an error has occurred.

*Shaft position digitizer*

My shaft position digitizer 31 is shown in detail in FIGURES 3 to 7 and is shown connected to a dial type instrument 32 which is shown to be an aneroid barometer. It consists of a main mounting frame 81 which has a circular base portion 82 and an upstanding centrally disposed post 83. A shaft 84 is rotatably mounted within the post 83 and is driven by a motor 86 mounted on the circular base 82 through a gear train assembly 87. The gear train assembly consists of a spur gear 88, which is affixed to the output shaft of the motor and which drives a larger spur gear 89. The larger spur gear 89 which is rotatably monuted on a shaft 91. The spur gear 89 carries a smaller pinion gear 92 which drives a larger spur gear 93 which is affixed to the shaft 84, and drives the same. A pair of printed circuit boards 96 and 97 are affixed to the center post 83 and insulated therefrom by spacers 93 in the manner shown and are provided with circuitry as hereinafter described for use in the shaft position digitizer.

A circular commutator board 101 is affixed to the post 83 by screws 102. The commutator board is provided with five conducting annular strips or bands 106–110. The strips or bands may be mounted on the board in any suitable manner such as by the use of printed circuitry. The strips 107–110 are solid, whereas the strip 106 is formed in such a manner that it gives the appearance of a railroad track. It is provided with circular stripes 111 and 112 which are connected by perpendicular lines 113. In this manner, insulating spots 114 are formed between the lines 113. It will be noted that the band 106 is not continuous but is provided with a space 117 in which a start segment 118 is provided which operates to provide a start pulse as hereinafter described. The outer band 106 is segmented into a desired scale which may be linear or nonlinear as desired. For example, a typical scale can be calibrated from zero to 135° F. when the shaft position device is connected to a thermometer, or it can be calibrated in terms of pressure when the shaft position device is connected to an aneroid barometer as in the embodiment shown in FIGURES 3–7. One advantage of the commutator board 101 is that all of the bands for the different types of boards will be identical except the outer band 106 which is calibrated to the particular instrument to which the digitizer is to be fitted.

The circular commutator board 101 seats within a circular phasing ring 121. The phasing ring 121 is provided with a small slot 122 which is adapted to receive a pin 123 carried by the commutator board 101 and extending radially therefrom. The phasing ring 121 is seated in an annular groove 126 provided in an adapter ring 127. The phasing ring 121 is adapted to be held in a predetermined location with respect to the adapter ring 127 by washers 128 which partially overlie the phasing ring as shown and which are held in place by cap screws 129 threaded into the adapter ring 127. The phasing ring can be adjusted to the desired position merely by loosening the screws 129, rotating the phasing ring, and thereafter clamping the washers 128 into engagement with the phasing ring by tightening the screws 129. The commutator board is releasably clamped within the phasing ring by keepers 131 which are affixed to the adapter ring 127 by screws 132.

From the construction shown, it is apparent that the commutator board 101 and the hardware associated with it can be removed merely by unlocking the keepers 131 without disturbing the displacement of the phasing ring. Thus, once the commutator board has been calibrated for a particular measuring instrument the commutator board and the associated hardware can be removed without disturbing this calibration. In this way, it is possible to check the instrument 32 to which the digitizer is connected and also to check the digitizer without disturbing the calibration.

An aneroid barometer 32 of a conventional type is secured to the adaptor ring 127 by a circular mounting clamp 133 which is affixed to the adaptor ring by screws 134. The aneroid barometer 32 is provided with a rotatable output shaft 136 which carries a pointer 137 which overlies the commutator board 101.

A rotor 141 is affixed to the end of the shaft 84 immediately above the commutator board 101 by suitable means such as a set screw 142 threaded into the rotor and engaging the shaft 84. Photoelectric sensing means is mounted in one end of the rotor, and the other end of the rotor is provided with a counter-weight 143. The photoelectric sensing means consists of a lamp 146 which is provided in a hole 147 extending at an angle with respect to the longitudinal axis of the rotor so that the light from the lamp is projected away from the center of the rotor at a suitable angle as, for example, an angle of 30°.

A lens in the form of a glass rod 148 is mounted on the rotor immediately above the hole 147 so that the light from the lamp is projected through the lens. The cylindrical rod-like lens is formed in such a manner that the light from the lamp 146 is focused to a stripe 149 of approximately 1/32 of an inch in width and which is spaced approximately 3/16 of an inch from the top of the lens so that it is at a level which corresponds to the level through which the pointer 137 will pass. As hereinafter explained, as the rotor 141 carrying the lamp 146 and the lens 148 passes beneath the pointer 137, a stripe of light will be reflected from the pointer through the same lens 148 and focused onto a suitable photoelectric element such as a solar cell 151 fastened to the rotor 141. In order to obtain the desired amount of reflection, suitable means is provided on the pointer 137 and can take the form of a mirror 153. However, it is possible to obtain sufficient reflection from a pointer which has been provided with a shiny surface assuming that the background against which the pointer rotates is painted black or has a relatively dark color.

A small printed circuit board 155 is carried with the rotor. It is provided with five wiper or commutator arms 156 through 160 which engage the annular bands or strips 106 through 110 respectively provided on the commutator board 101.

A U-shaped mounting 161 is secured to the main mounting frame 81 and is provided with an electrical connector 162. The U-shaped mounting 161 is provided for the purpose of protecting the gear assembly 87 and also provides means for supporting the connector 162. A suitable weather cover 163 is mounted over the entire shaft position digitizer and as shown fits over the adapter ring 127 and is secured to the mounting 161 by a screw 164. An O-ring 166 is mounted in a groove 164 provided on the adapter ring and provides a seal between the adapter ring and the cover. An o-ring 167 is also provided on the connector 162 for establishing a tight seal between the connector and the cover 163.

Figure 12:
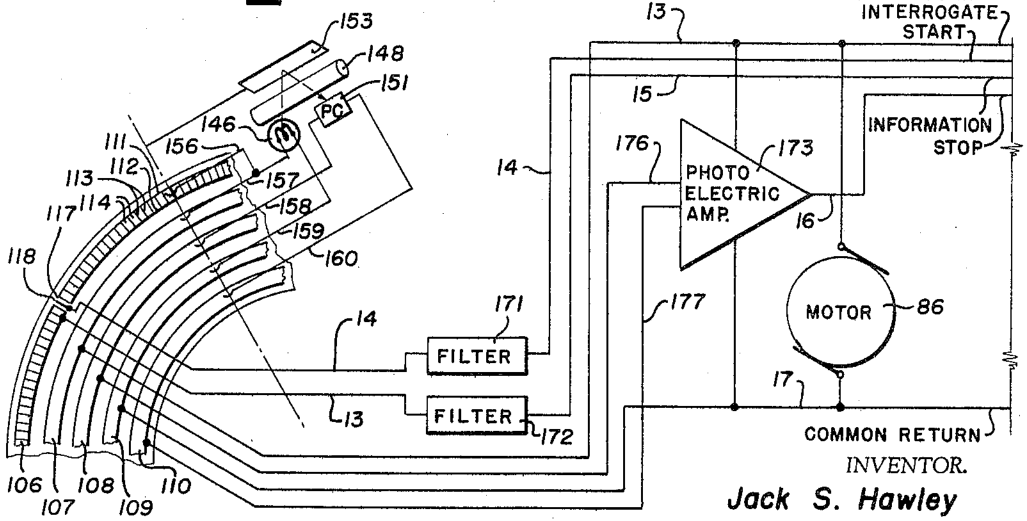
FIGURE 12 is a partial schematic illustration of my shaft position digitizer with a block diagram of the electrical circuitry utilized.

The electrical circuitry comprising my shaft position digitizer is shown in FIGURE 12. As shown therein, the band 107 is connected to the interrogate line 13 which is connected through the wiper 157 through the lamp 146 through the wiper 159 to the band 109 to the common return line 17. The start line 14 is connected through a filter and isolating network 171 to the start segment 118. The information line 15 is connected to a filter and isolating network 172 to the band 106 and through the wiper 157 to the band 107. The stop pulse line 15 is connected to the output of a photoelectric amplifier 173 which is supplied with power from the interrogate line 13 and connected to the common return line 17 as shown. The photoelectric amplifier 173 is controlled by lines 176 and 177 which are connected to bands 108 and 110. These bands 108 and 110 are connected to the photoelectric cell 151 through the wipers 158 and 160. The motor 86 is connected between the interrogate line 13 and the common return line 17 so that it is energized when a signal is received on the interrogate line as hereinafter described.

*Shaft velocity digitizer*

My shaft velocity digitizer 33 is shown in detail in FIGURES 8–11. It consists of a mounting ring 181 which is substantially identical in size to the commutator board 101. This mounting plate has the same size as the commutator board 101 so that the shaft velocity digitizer can be mounted in housings which are identical to those provided for the shaft position digitizers. Thus, the plate 181 can be mounted in the phasing ring in the same manner in which the commutator board 101 is mounted in the phasing ring. However, the phasing ring is not required in the shaft velocity digitizer.

A U-shaped mounting channel 182 is fixed to the rear of the circular plate 181 and carries four printed circuit boards 183, 184, 186 and 187 which are mounted thereon by bolts 188. A relay RY–1 is also mounted on the mounting channel 182 in a socket 189. The printed circuit boards carry eelctronic circuitry for the shaft velocity digitizer as hereinafter described.

A connector 191 is affixed to the channel 182 by a mounting plate 192 in such a manner that it is positioned in the same manner as the connector 162 provided on the shaft position digitizer. This makes it possible to utilize the same housings for different digitizers.

A sensing assembly is mounted on the other side of the circular plate 181 and consists of a fixed arm 194 which is fixed to the mounting plate 181 and the U-shaped channel 182 by a screw 196 and is maintained in a spaced predetermined relationship with respect to the circular plate 181 by a spacer 197. The sensing assembly is substantially identical to the sensing assembly utilized for the shaft position digitizer and includes a lamp 146, a lens 148 and a photosensitive cell 151. The lamp 146 is mounted in an inclined hole 198 provided in the fixed arm 194. A printed circuit board 201 is fixed to the fixed arm 194. In addition to carrying a printed circuit it carries contacts 202 which are connected to electrical circuitry hereinafter described.

A particular enclosure for the shaft velocity digitizer adapted for outdoor use is shown in FIGURES 8–11. The enclosure consists of a cylindrical body 206 which is provided with an opening 207 adapted to receive the connector 191. The body is also provided with a circular mounting hole (not shown) which is adapted to receive a pipe or pole to permit the entire device to be mounted at an elevation.

Figures 8, 9, 10, 11:
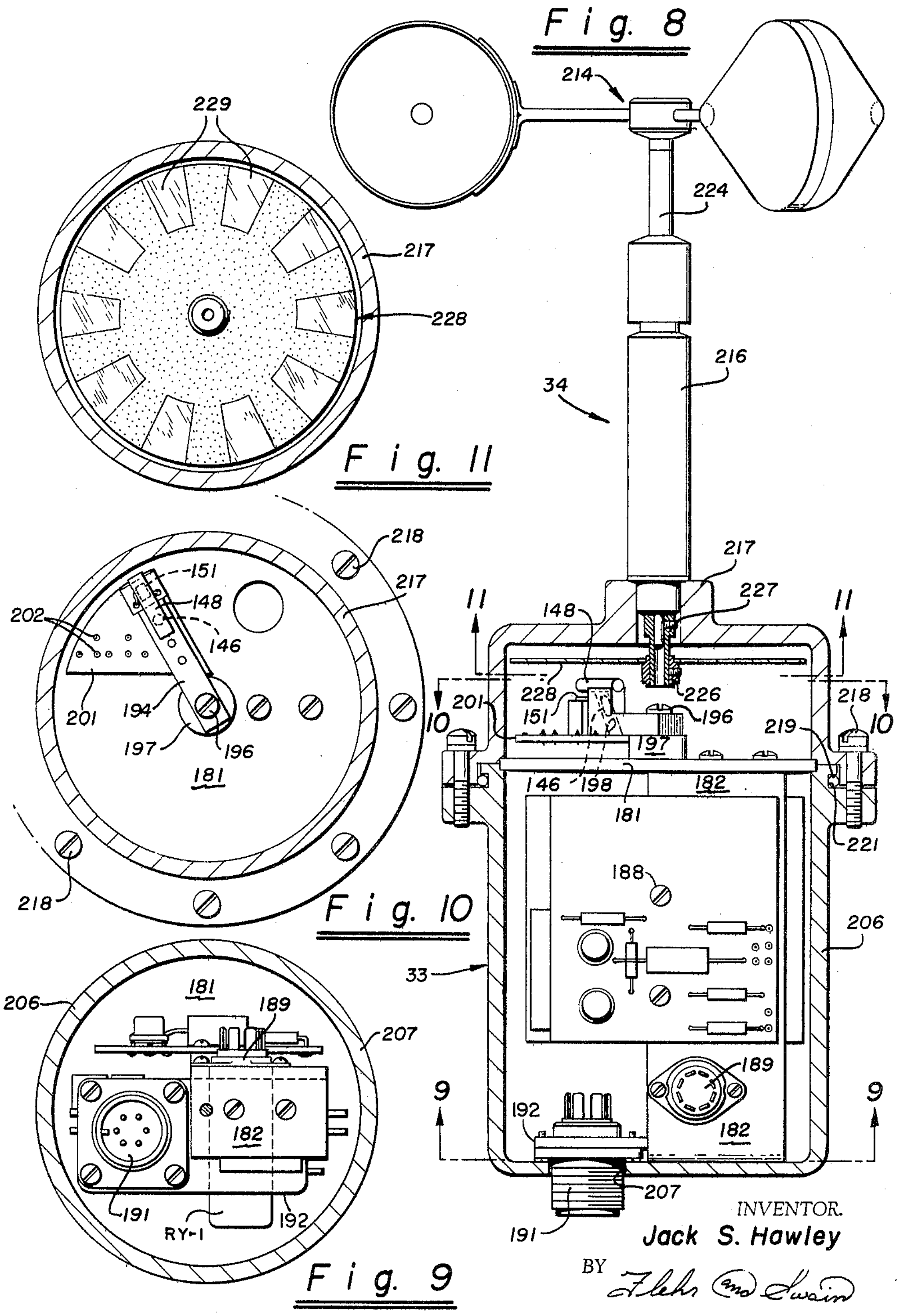
FIGURE 8 is a cross-sectional view of a shaft velocity digitizer incorporating my invention connected to wind velocity cups.
FIGURE 9 is a cross-sectional view taken along the line 9—9 of FIGURE 8.
FIGURE 10 is a cross-sectional view taken along the line 10—10 of FIGURE 8.
FIGURE 11 is a cross-sectional view taken along the line 11—11 of FIGURE 8.

As hereinbefore described, the shaft velocity digitizer is adapted to be used with any rotating shaft type instrument. A typical rotating shaft type instrument is shown in FIGURE 8 of the drawing and consists of a rotating cup assembly 214 of conventional manufacture which is rotatably mounted in a drive bearing assembly 216 fixed in a top cap 217. The cap 217 forms a part of the enclosure and is secured to the body 206 by cap screws 218. An O-ring 219 mounted in a groove 221 provided in the body provides a tight seal between the cap and the body. The cap 217 and the body 216 are clamped together in such a manner that they engage the outer margin of the circular plate 181 to hold the shaft velocity digitizer in place.

The cup assembly 214 is provided with a shaft 224 which rotates at a speed determined by the velocity of the wind. The shaft 224 extends downwardly through the bearing assembly 216 and is connected to a hub 226 by connector assembly 227. The hub carries a disc 228 which travels in a space generally overlying the sensing assembly provided on the shaft velocity digitizer. The disc 228 is provided with regularly spaced reflecting portions which reflect light onto the photoelectric cell 151 at periodic intervals in accordance with the speed of rotation of the shaft 224 as hereinafter described. The reflecting portions can take any desired form. For example, they can be a plurality of mirrors fixed to the bottom side of the disc at predetermined equally spaced angles on the disc. Alternatively they can take the form of polished segments on the disc with the remaining portions of the disc being black. For example, the disc could be provided with 10 light reflecting segments 229 having a width of approximately 18° and spaced on centers 36° apart. Normally, the number of segments should be chosen so that the output from the shaft velocity digitizer is in a suitable form. For example, with a cup assembly of the type manufactured by Beckman and Whitley of San Carlos, Calif., it was found that by taking the revolutions per second vs. miles per hour of wind, ten reflecting segments on the disc 228 utilizing a time base of 351 milliseconds between the stop and start pulses produced one output pulse per mile per hour of wind velocity.

Figure 13:
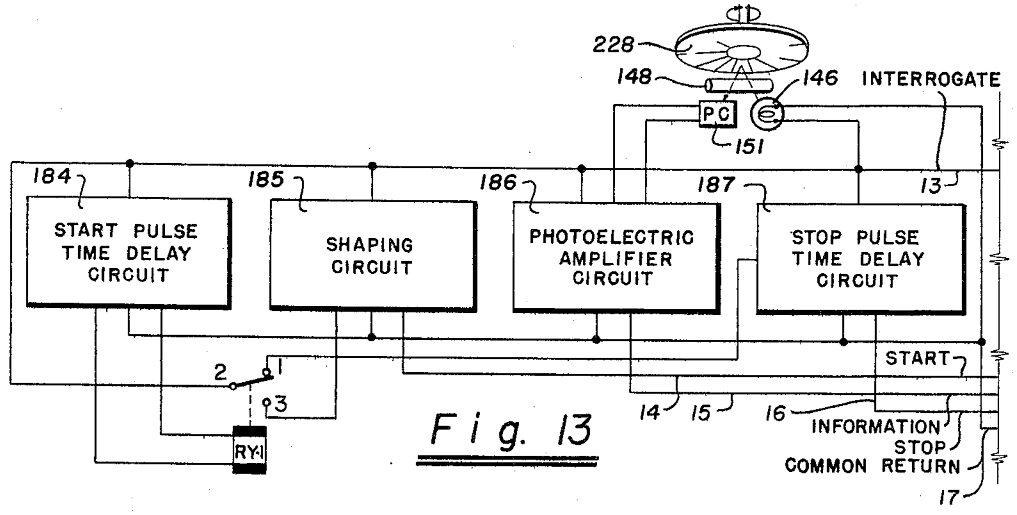
FIGURE 13 is a partial schematic illustration of my shaft velocity digitizer with a block diagram of the electrical circuitry utilized.

The electrical circuitry associated with the shaft velocity digitizer is shown in FIGURE 13. As shown in block form, the printed circuit boards 184, 185, 186 and 187, respectively, carry a start pulse time delay circuit, a start pulse shaping circuit, a photoelectric amplifier circuit and a precision stop pulse time delay circuit. The interrogate start, information, stop, and common return lines 13 through 17 are connected in the circuitry as shown.

*Pulse rate digitizer*

Figure 14:
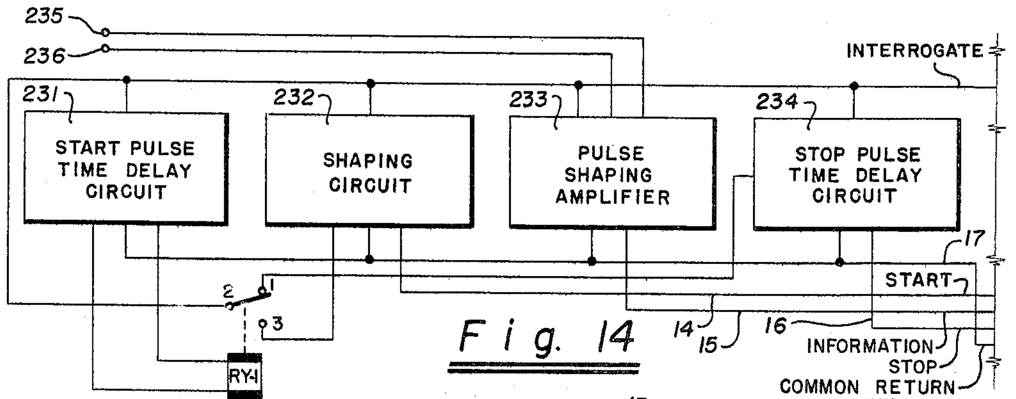
FIGURE 14 is a block diagram of the circuitry utilized in my pulse rate digitizer.

A block diagram of my pulse rate digitizer is shown in FIGURE 14. As can be seen from the drawing, it is very similar to the circuitry for the shaft velocity digitizer. It consists of a start pulse time delay circuit 231, a start pulse shaping circuit 232, a pulse shaping amplifier 233 and a precision stop pulse time delay circuit 234. Terminals 235 and 236 are provided which are connected to the pulse shaping amplifier. The terminals 235 and 236 are adapted to be directly connected to the apparatus 37 which is supplying the pulses.

Since my pulse rate digitizer is substantially an electronic circuit, no particular packaging is required. However it can be readily packaged in an enclosure which is of a size less than that provided for the shaft position digitizer and the shaft velocity digitizer.

*Electrical analog digitizer*

Figure 15A:
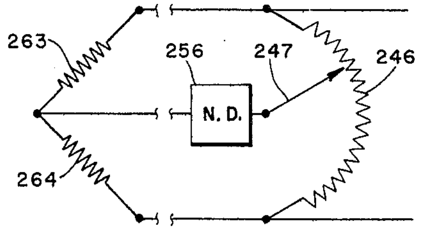
FIGURE 15A is a diagram showing the bridge used in FIGURE 15 arranged in a conventional manner.
Figure 15:
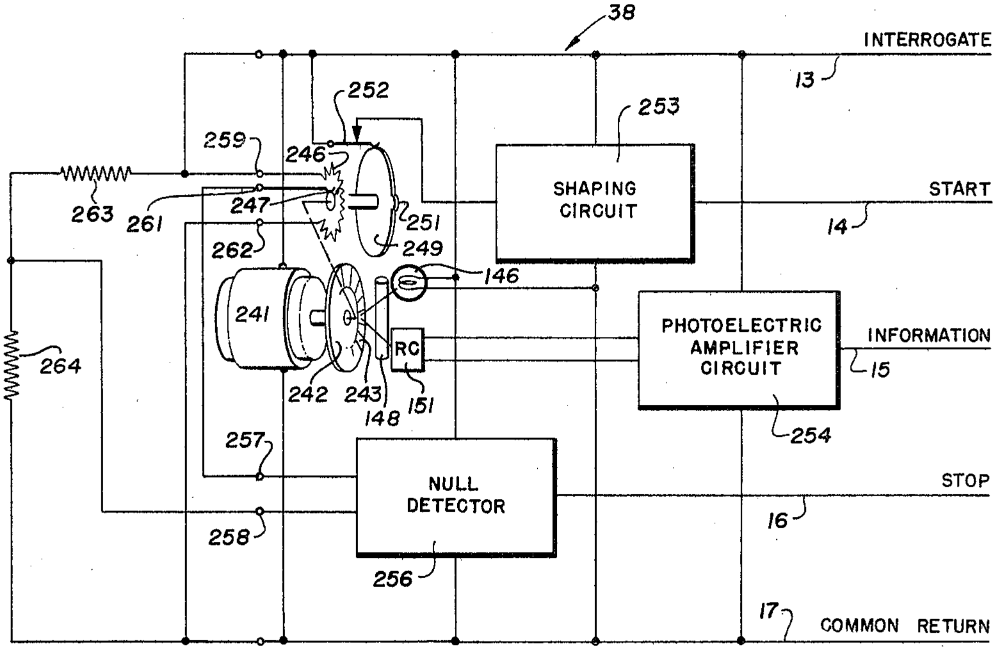
FIGURE 15 is a block diagram with certain parts schematically illustrated of an electrical analog digitizer incorporating my invention.
Figures 3, 4, 5:
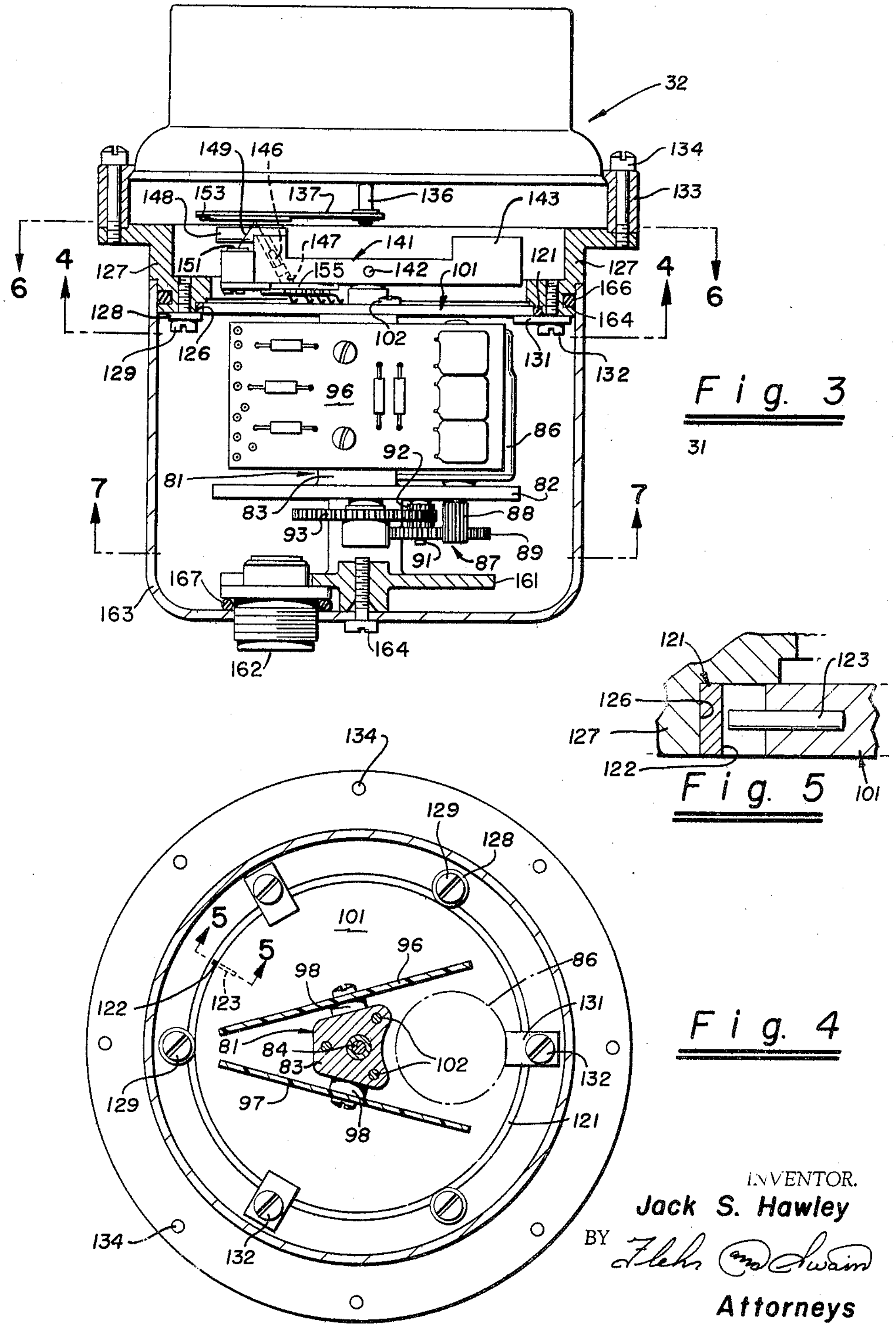
FIGURE 3 is a cross-sectional view of a shaft portion digitizer incorporating my invention connected to an aneroid barometer.
FIGURE 4 is a cross-sectional view taken along the line 4—4 of FIGURE 3.
FIGURE 5 is an enlarged detail view of a portion of the phasing means utilized indicated at 5—5 in FIGURE 4.
Figure 6:
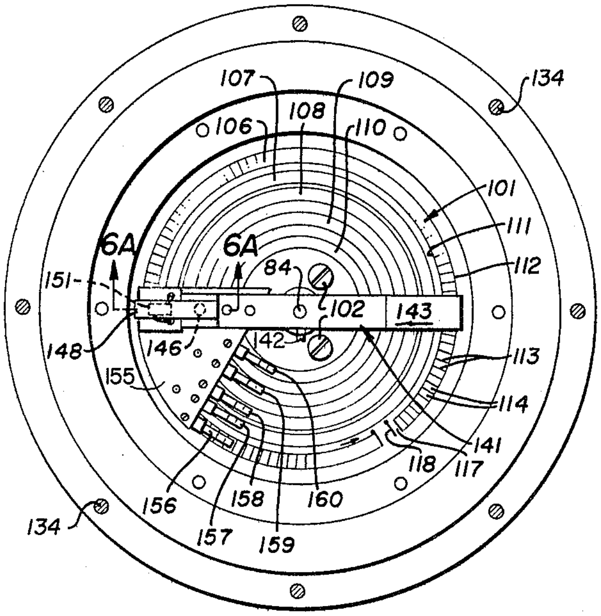
FIGURE 6 is a cross-sectional view taken along the line 6—6 of FIGURE 3.
Figure 7:
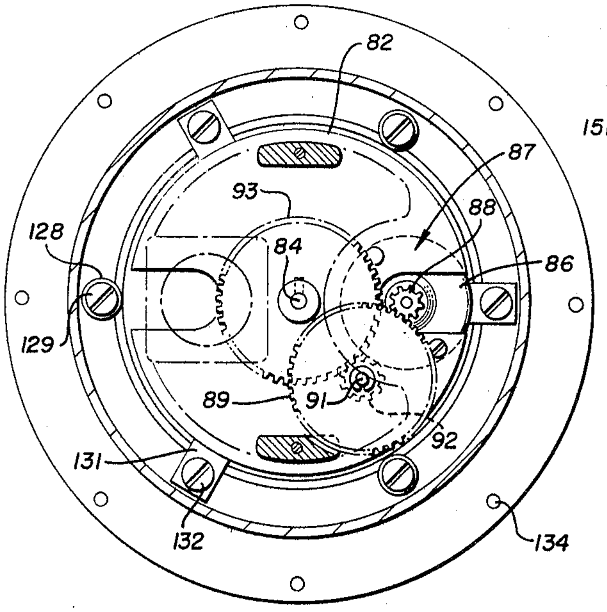
FIGURE 7 is a cross-sectional view taken along the line 7—7 of FIGURE 3.
Figure 6A:
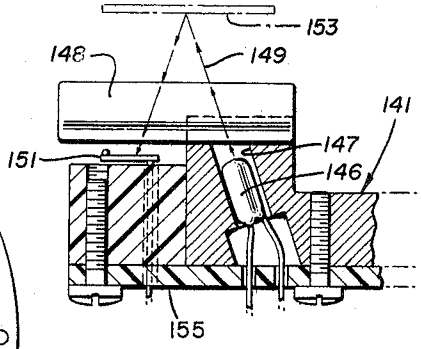
FIGURE 6A is an enlarged detail view taken along the line 6A—6A of FIGURE 6.

A particular form of my electrical analog digitizer 38 is shown in FIGURE 15 wherein it takes the form of a digital bridge transducer. It consists of a D.-C. permanent magnet motor 241 which drives a disc 242 that is provided with reflecting segments 243 so that the disc serves as a light chopper to produce pulses which are linear with shaft rotation. The motor 241 also drives a potentiometer 246 through appropriate gearing (not shown) such as gearing providing a 20 to 1 reduction. The motor 241 actually drives the wiper 247 of the potentiometer which is mounted on the shaft 248. A disc 249 is also mounted on the shaft 248 and is provided with a raised portion 251 which is adapted to close normally open contacts 252 when it comes into engagement with the contacts. The movable contact of the contacts 252 is connected to the interrogate line 13 whereas the stationary contact of the contacts 252 is connected to a start pulse shaping circuit 253. The output of the pulse shaping circuit 253 is connected to the start line 14. The photoelectric cell 151 is connected to a photoelectric amplifier circuit 254. A null detector 256 forms the stop pulse on the line 16 and is provided with terminals 257 and 258 which are adapted to be connected into the bridge circuit shown in FIGURE 15A. The potentiometer is provided with terminals 259, 261 and 262 which also are connected into the bridge circuit shown in FIGURE 15A. As can be seen from FIGURE 15A, the potentiometer 246 forms two legs of the bridge and the unknown resistor 263 and the known resitsor 264 form the other legs of the bridge.

*Logic unit*

Figure 16:
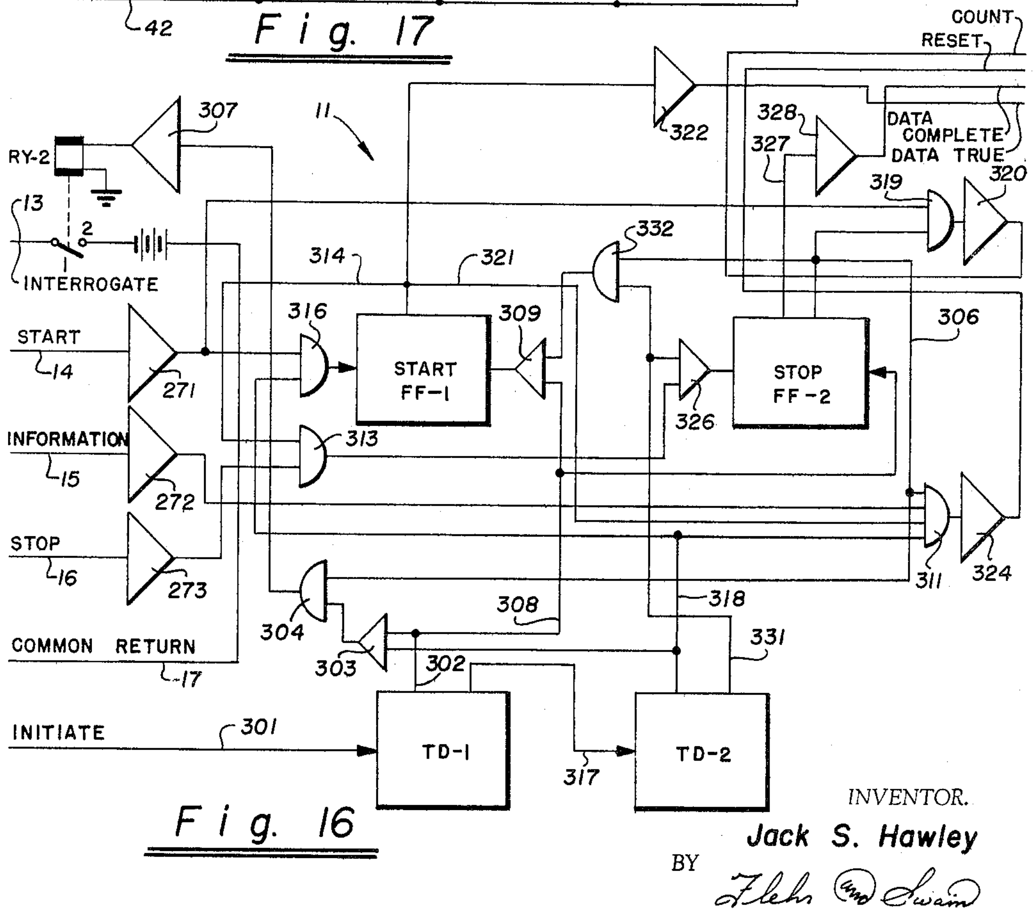
FIGURE 16 is a block diagram of the logic unit shown in FIGURE 1.

A block diagram of the logic unit 11 is shown in FIGURE 16. It consists of three squaring amplifiers 271, 272 and 273 which are connected to the start, information and stop lines 14, 15 and 16 respectively. It also includes a start flip-flop FF–1 and a stop flip-flop FF–2, two time delay circuits TD–1 and TD–2 of a suitable type such as one-shot multivibrators, a relay RY–2 and numerous other components which will be described during the sequence of operation of the logic unit.

*Decimal counting units*

Figure 17:
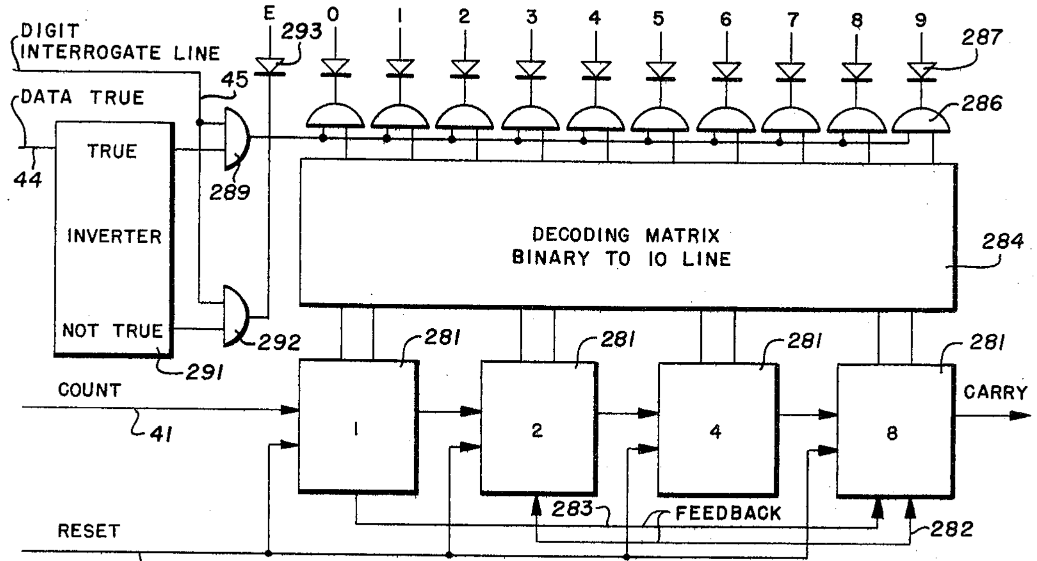
FIGURE 17 is a block diagram of one of the decimal counting units shown in FIGURE 1.

A block diagram of one of the decimal counting units is shown in FIGURE 17 and consists of four binaries 281 which have been connected in a conventional manner to provide a decimal counting circuit well known to those skilled in the art. The binaries are identified as "1," "2," "4" and "8" binaries respectively and are provided with feed-back loops 282 and 283. The reset line 42 is connected to each of the binaries. The output of the connected binaries is connected to a "carry" line which is connected to the succeeding decimal counting unit as hereinbefore described. The outputs of the individual binaries are supplied to a decoding matrix 284 also of a conventional type which converts the binary information into 10-line information. The 10-line outputs are connected to AND gates 286 which have their outputs connected to one terminal of AND gates 286. The outputs of the AND gates are connected to isolating diodes 287. The outputs of the diodes are identified by the digit which it represents as shown in the drawing. The other input terminal of each of the diodes 286 is connected to the output of another AND gate 289. A digit interrogate line 45 is connected to one input terminal of the AND gate 289. The signal on the digit interrogate line may be supplied from any desired apparatus. For example it can be supplied by the print out equipment being used. The other input terminal of the AND gate 289 is connected to one output of an inverter 291. The input of the inverter 291 is connected to the data true line 44. The other output of the inverter 291 is connected to an AND gate 292 which has its output connected to an isolating diode 293. The isolating diode is connected to an error line as indicated. The other input of the AND gate 292 is connected to the digit interrogate line 45.

*Detailed operation of entire system*

Operation of the entire system may now be briefly described as follows: Let it be assumed that the selecting means 21 has been set to a terminal which will select the shaft position digitizer 31. The initiate push button of the logic unit 11 may then be operated to apply voltage to the initiate line 301 in FIGURE 16 to cause operation of the time delay device TD–1. The time delay device TD–1 is provided so that the logic unit 11 will not be in condition to receive any information from the devices to which it is connected until a predetermined time has elapsed. This is because certain of the devices 12 such as the shaft position digitizer 31 may send information pulses before it sends a start pulse and also because it is possible that it may send a stop pulse before a start pulse is sent. This is possible because in none of the devices 12 is braking means applied to stop them in any predetermined position. Therefore, at the commencement of the interrogation operation, the exact position of the digitizers is unknown. Thus, as hereinafter explained, the logic unit 11 includes means so that it will not accept any information pulses before a start pulse is received. The time delay provided by the time delay device TD–1 permits the lamp 146 to come up to brilliance, the motor 86 to come up to speed and switching transients which may exist in the circuit to die down.

At the time the time delay device TD–1 is energized by the initiate signal on line 301 an output is supplied on the line 302 to an OR gate 303 which has its output connected to an AND gate 304. The stop flip-flop FF–2 is in a reset condition and applies an output on the line 306 which is supplied to the other input terminal of the AND gate 304 so that an output signal is supplied to the amplifier 307 to energize the relay RY–2. Energization of the relay RY–2 closes its normally open contacts 1 and 2 to apply a negative voltage to the interrogate line 13.

It will be noted that a conductor 308 is connected to the conductor 302 so that upon initiation of the time delay device TD–1, a reset signal is applied to the start flip-flop FF–1 through OR gate 309 and directly to the stop flip-flop FF–2 as shown. The reset signal is applied to the start flip-flop FF–1 through an OR gate 309.

The interrogate signal is supplied on the line 13 through the selecting means 21 to the shaft position digitizer 31. This negative voltage on the line 13 is applied across the motor 86 to cause it to operate and also to energize the photoelectric amplifier 173. The voltage is also applied to the band 107 on the commutator board 101 after which it passes through the wiper 157 to the lamp 146, the wiper 159, band 109 to the common return line 17. Thus, it can be seen that as soon as the logic unit is initiated, an interrogate signal is applied to the line 13 to start operation of the motor 86 to cause rotation of the wipers 156 through 160 relative to the commutator board 101.

As soon as the motor 186 is operating, the wiper 156 will travel over the stripes 113 to periodically establish a circuit from the interrogate line 113 to the band 107 through the wiper 157 to the wiper 156 through the contact made on the individual stripes 113 through the information line 15 through the filtering and isolating circuit 172 to the logic unit 11. Thus, it can be seen that immediately upon operation of the initiate circuit, the motor in the selected digitizer will be in operation and will cause information signals to be returned on the information line 15 as shown in FIGURE 2 commencing with the time $T_0$. The selected digitizer will continue to operate as long as it receives an interrogate signal on the line 13.

Let is be assumed that the digitizer 31 was in such a position that information pulses are being sent over the information line 15 before a start pulse was transmitted. When such is the case, the information pulses will be supplied through the squaring amplifier 272 which has its output connected to one of four input terminals of an AND gate 311. One of the other terminals of the AND gate 311 is connected to the line 306 which has the voltage applied to it when the logic unit is in this position because the stop flip-flop FF–2 is in the reset condition. Another input terminal of the AND gate 311 is connected to the left-hand output of the start flip-flop FF–1. However, since flip-flop FF–2 is in a reset condition no voltage is applied to the AND gate 311. The fourth input of the AND gate is connected to the time delay device TD–2. However, the time delay device TD–2 has not been energized and no voltage is applied to the fourth input. Since no voltages are being applied to the third and fourth input terminals of the AND gate 311, the AND gate is closed and the information pulses which are received on the information line 15 will not be passed by the AND gate 311.

Now let it be assumed that the shaft position digitizer sends a stop pulse. A stop pulse is generated when the arm 141 which is driven by the motor 86 causes the lens 148 to pass under the mirror 153 which is carried by the pointer 137 (see FIGURE 3). At this time light from the lamp 146 passes through the lens 148 and onto the mirror 153 and is reflected dowwardly again through the lens 148 onto the photoelectric cell 151 as shown in the dotted lines in FIGURE 12, to cause a stop pulse to be applied to the photoelectric amplifier 173 through the wipers 158 and 160. The stop pulse is amplified by the amplifier 173 and then is applied to the stop line 16 and to the squaring amplifier 273 in the logic unit. However, the stop pulse will not be accepted because the output of the amplifier 273 is connected to one of the inputs of the AND gate 313. The other input of the AND gate is connected to the start flip-flop FF–1 which is in the reset condition and hence does not supply a voltage to the conductor 314.

Now let it be assumed that a start pulse is produced by the shaft position digitizer 31 during the time delay represented by the time delay circuit TD–1 which is shown as the time from $T_0$ to $T_1$ in FIGURE 2. The start pulse is generated in the shaft position digitizer 31 when the wiper 156 passes over the segment 118 and supplies a pulse on the start line 14 through the filter 171. The start pulse on line 14 passes through the squaring amplifier 271 and is applied to one of the input terminals of the AND gate 316. However, since the other input terminal of the AND gate 316 is connected to the output of the time delay device TD–2 which has not been enegrized the start pulse is not accepted. Thus, it can be seen that during the time the time delay device TD–1 is operating, the logic unit 11 is not responsive to any type of pulses.

Now let it be assumed that after a suitable interval of time such as .2 of a second which is represented by the time $T_0$ to $T_1$ in FIGURE 2, the time delay device TD–1 applies a signal to the line 317 to apply a signal to the time delay device TD–2. At the time the time delay device TD–2 is operated, a signal is applied to the line 318 to apply signals to the AND gates 311 and 316. Now let it be assumed that a start pulse is received from the shaft position digitizer 31. The start pulse will be received from the start line 14 by the AND gate 316 and applied to start flip-flop FF–1. This occurs because the AND gate is open since a signal is applied to the other input of the AND gate 316 by the time delay device TD–2.

At the same time, the start pulse is applied to the AND gate 319 which is open because a signal is being applied to the other input terminal from the right-hand side of the stop flip-flop FF–2 as viewed in FIGURE 16 which is in the reset condition. Therefore the AND gate 319 produces a reset pulse which passes through the amplifier 320 and is applied to the reset line 42 to reset each binary in each of the decimal counting units shown particularly in FIGURE 17. Thus upon receipt of the start pulse, all of the decimal counting units are cleared so that they are ready to receive information. This is particularly important in the case of a shaft position digitizer where the pointer might go through from a high number to zero during the course of the reading or vice versa. In such a case a new start pulse would be received without receiving a stop pulse. It is therefore necessary that the start pulse reset the binaries to permit a net count to be obtained.

A signal is also applied from the start flip-flop FF–1 to data true line 44 through the amplifier 322. This data true signal is applied to the inverter 291 in FIGURE 17 which supplied a signal to one input terminal of the AND gate 289. However, nothing will occur at this time because a signal is not being received on the digit interrogate line 45 which is connected to the other input terminal of the AND gate 289.

The application of the start pulse to the start flip-flop FF–1 sets the flip-flop so that an output is supplied on its left-hand terminal as viewed in FIGURE 16 to the conductor 314 to apply a signal to one of the input terminals of the AND gate 313 to open the AND gate 313 for the receipt of a stop pulse or information pulses as hereinafter described. At the same time a signal is applied to the line 321 and the AND gate 311 by the start flip-flop FF–1.

Now let it be assumed that information pulses or signals are being received on the line 15 from the shaft position digitizer 31. These information pulses will be again supplied to the AND gate 311 through the amplifier 272. The pulses will pass through the AND gate 311 and the amplifier 324 to the count line 41 because signals are being applied to the other three input terminals of the AND gate 311. The uppermost terminal is supplied with a signal because it is connected to the right-hand side of the stop flip-flop FF–2 as viewed in FIGURE 3, which is in the reset condition. The third terminal from the top is being supplied with a signal from the start flip-flop FF–1 which is in the set condition and the fourth terminal is being supplied with a signal from the time delay device TD–2.

The information pulses on line 41 are supplied to the decimal counting units shown in FIGURES 1 and 17 and are counted in a conventional manner. The outputs of the binaries 281 are supplied to a decoding matrix 284 which converts the binary information to 10-line information.

Now let it be assumed that a stop pulse is generated in the shaft position digitizer 31 and is received on the stop line 13 and is applied to the AND gate 313. Since the AND gate 313 is open because of a signal supplied by start flip-flop FF–1, the stop pulse passes through the AND gate and is applied to an OR gate 326 which has its output connected to the stop flip-flop FF–2 to set the stop flip-flop FF–2. Setting of the stop flip-flop FF–2 causes a signal to be applied to the output line 327 to an amplifier 328 to provide the data complete signal on line 43. This data complete signal is supplied to each individual decimal counting unit through the digit interrogate line 45 to the AND gate 289 to cause the information in the binaries 281 in each decimal counting unit to be supplied through the AND gates 286 and the isolating diodes 287 to the appropriate recording means which may be visual or other types as hereinbefore described in conjunction with FIGURES 1A and 1B. In FIGURE 1A the data complete signal is supplied to all of the decimal counting units at the same time because the digit interrogate lines 45 are connected in parallel to the data complete line 43 whereas in FIGURE 1B, the data complete signal is supplied to the automatic digit sequencing equipment which supplied signals in sequence to the digit interrogate lines 45. Thus upon receipt of the signal on the data complete line 43 all of the information in the decimal counting units will be recorded simultaneously or serially depending upon the arrangement used.

Now let it be assumed that all of the foregoing, that is, the receipt of the start pulse, the information or count pulses and the stop pulses have been received within the period represented by the time delay device TD–2 (shown as the time between $T_1$ and $T_2$ in FIGURE 2) which may be of any suitable length as for example 1.2 seconds. Now let it be assumed that the time delay period represented by the time delay device TD–2 has expired and an output signal is applied to the conductor 331 which is applied to one input terminal of an AND gate 332. The AND gate 332 is provided to detect whether the stop flip-flop FF–2 has been set at the time TD–2 terminates. If the stop-flip-flop FF–2 has not been set, a signal will be applied to the other input terminal of the AND gate 332 to apply a signal to the OR gate 309 to reset the start flip-flop FF–1 to remove the signal from the data true line 44. When this occurs, the inverter will supply a signal to one input terminal of the AND gate 292. The other input of the AND gate is connected to the digit interrogate line which will have a signal on it to supply on the line connected to the error isolating diode 293 to indicate that an error has occurred.

At the time the time delay circuit TD–2 energizes the circuit 331 to indicate the termination of the time delay period ending at $T_2$ the signal from the circuit 318 is removed from the AND gate 304 to close the AND gate 311 to prevent transmission of additional count pulses to the decimal counting units. The interrogate signal is removed from the interrogate line 13 at the time the top flip-flop FF–2 is set by the stop pulse. This occurs because the signal applied to the conductor 306 is removed to close the AND gate 304. After the interrogate signal has been removed from the interrogate line 13, no energy is supplied to the motor 86 and the motor coasts to a stop as shown in FIGURE 2. Information pulses or another start pulse may possibly be sent to the logic unit 11 because of the time required for the relay RY–2 to drop out but these information pulses and start pulse will not be effective because the AND gates 311 and 316 have been closed by the setting of the stop flip-flop FF–2.

After the time delay device TD–2 has timed out, the logic unit is in condition so that it can be initiated again to receive information from another selected digitizer. As soon as the initiate signal is applied to the time delay device TD–1 the start flip-flop FF–1 and the stop flip-flop FF–2 are reset as are the decimal counting units. The operation of the logic unit 11 and the decimal counting units 46 with each of the digitizers is substantially identical to that hereinbefore described.

When a digitizer is selected by the selecting means 21 which is of the shaft velocity type such as the shaft velocity digitizer 33, the interrogate signal is applied to the interrogate line 13 which energizes the lamp 146 and the four circuits 184, 185, 186 and 187. Upon receipt of the interrogate signal, the start pulse time delay circuit begins operating to energize relay RY–1 after a predetermined interval of time. Opening of contacts 1 and 2 of relay RY–2 starts the stop pulse time delay circuit 234. Closing contacts 2 and 3 of relay RY–2 supplies a start pulse to the start pulse shaping circuit 185. A start pulse is then supplied to the start pulse line 14 by the circuit 185. However, it should be pointed out that from the time the interrogate signal is received on the line 13, information pulses are being supplied to the information line 15 by the photoelectric amplifier circuit 186. This amplifier circuit 186 amplifies the pulses supplied by the photosensitive cell 151. The cell 151 has light periodically reflected onto it by a lens which receives light reflecting segments provided on the disc 228. The light source is the lamp 146 which shines through the lens 148. However, as pointed out previously, the logic unit 11 will not receive these information pulses until the start pulse has been received and the time delay device TD–2 has begun operation. As soon as the precision start pulse is generated by the circuit 185, the information pulses will be received in a manner similar to that hereinbefore described by the logic unit. At the conclusion of a precise time interval, a precision stop pulse is generated by the time delay circuit 187 which applies the stop pulse to the stop pulse line 16. As pointed out previously by choosing the proper number of reflecting segments on the rotating disc and by adjusting the time delay provided by the precision stop pulse time delay circuit 187, it is possible to provide information pulses which represent an exact physical quantity as for example one pulse may represent the one mile per hour of wind velocity. A slight adjustment of the time delay circuit 187 could produce a reading in kilometers per hour or nautical miles per hour.

The pulse rate digitizer 36 which is shown in block diagram form in FIGURE 14 is very similar to the shaft velocity digitizer and operates in a similar manner. However, in this embodiment, a pulse shaping amplifier 233 has been provided in place of the photoelectric amplifier circuit 186. The pulses to be counted are applied directly to the pulse shaping amplifier circuit 186 so that they are supplied to the information line 15. This pulse rate digitizer makes it possible to utilize pickup apparatus provided by others and to place the information in a common language which can be accepted by the logic unit 11.

The digital bridge transducer shown in FIGURE 15 also provides signals which have the language which is common with the other digitizers hereinbefore described. The interrogate signal received on line 13 energizes a photoelectric amplifier circuit 254, a start pulse shaping circuit 53 and a null detector 256. It also drives a motor 241 which drives a disc 242, a potentiometer wiper 247 and a disc 249. Information pulses are transmitted as soon as the motor is started by reflections onto the photoelectric cell 151 from the reflecting segments 243 provided on the disc 242. However, these will again not be received by the logic unit until a start pulse is supplied to the logic unit by the closing of the switch 252 by the raised portion on the disc 249 to provide a start pulse which is shaped in the pulse shaping circuit 253 and supplied to the start line 14. The information pulses are produced until a stop pulse is produced by the null detector 256. As shown in FIGURE 15A the null detector 256 is connected into a conventional Wheatstone bridge. As is well known to those skilled in the art null detector detects when the wiper 247 passes through zero. The stop pulse is generated by the null detector 256 when the zero position is detected.

It is readily apparent that this circuit shown in FIGURE 15 can be used for measuring other electrical analog quantities such as voltages utilizing a reference voltage.

It is apparent from the foregoing that I have provided a digital data system and apparatus which has great utility and which is relatively simple and inexpensive. The digitizers used all have a common output language so that they all can be connected in parallel and selected sequentially. The logic unit is arranged so that the shaft position digitizers need not stop in any predetermined position but can start from any position. The logic unit and the decimal counting unit are arranged in such a manner that if an error occurs, a positive indication is given of the error.

I claim:

1. In a digital data system, a plurality of devices, each device including means for measuring a measurand and producing a physical output, digitizing means connected to said means for measuring and translating the physical output into a plurality of electrical pulses, a logic unit, the logic unit including means for initiating the logic unit, selecting means connecting the logic unit to a selected digitizing means, the logic unit including means for sending an interrogate signal upon operation of the initiating means from the logic unit to the selected digitizing means to cause operation of the digitizing means, the digitizing means including means for sending to the logic unit a start pulse, a sequence of information pulses representing by their total number the physical output from the measuring means, and a stop pulse, a plurality of counting units connected to the logic unit for counting the information pulses from the logic unit and registration means for registering the output from the counting units.

2. A digital data system as in claim 1 wherein said logic unit includes time delay means providing a first predetermined time delay and means associated with said time delay means for preventing transmission of the information pulses to the counting units before the elapse of the first predetermined time delay.

3. A digital data system as in claim 2 wherein said logic unit also includes second time delay means providing a second predetermined time delay and wherein said logic unit and said registration means includes means for giving an error indication when the start pulse, the information pulses and the stop pulse are not received within the second predetermined time delay.

4. A digital data system as in claim 1 wherein said logic unit includes time delay means providing a first predetermined time delay and means associated with the first time delay means for preventing information pulses and stop pulses from becoming effective in the logic unit during the first predetermined time delay.

5. A digital data system as in claim 4 wherein said logic unit includes second time delay means providing a second predetermined time delay and means associated with said second time delay means to prevent information pulses and stop pulses from becoming effective during the second pretermined time delay until a start pulse has been received.

6. A digital data system as in claim 1 wherein said counting units are connected so that they can be read out in parallel.

7. A digital data system as in claim 1 wherein said counting units are arranged so that they can be read out serially.

8. A digital data system as in claim 1 wherein said digitizing means includes means for sensing a shaft position.

9. A digital data system as in claim 1 wherein said digitizing means includes means for sensing a shaft velocity.

10. A digital data system as in claim 1 wherein said digitizing means includes means for digitizing a plurality of pulses.

11. A digital data system as in claim 1 wherein said digitizing means includes means for digitizing an electrical quantity.

12. A digital data system as in claim 1 wherein said digitizing means includes a movable reflecting surface, a lamp for directing light onto the reflecting surface, a photoelectric cell for receiving light from the reflected surface, and circuitry connected to the cell for forming a stop pulse when the light is reflected on to the photoelectric cell.

13. A digital data system as in claim 12 together with a cylindrical glass rod focusing the light from the lamp and the reflecting system.

14. A digital data system as in claim 13 wherein said lamp and photoelectric cell are movable with respect to the reflecting surface.

15. A digital data system as in claim 13 wherein the lamp and photoelectric cell are stationary and wherein the reflecting surface is adapted to rotate with respect to the lamp and photoelectric cell.

16. In a digital data system, a plurality of sensing instruments for measuring certain parameters, a digitizer physically attached to each sensing instrument, a logic unit, selecting means connecting the logic unit to a selected digitizer, each digitizer including means for sending to the logic unit, a start pulse, a sequence of information pulses representing by their total number the physical reading of the sensing instrument, and a stop pulse, a plurality of counting units connected to the logic unit for counting the information pulses and registration means for registering the output of the counting units.

17. A digital data system as in claim 16 wherein the logic unit includes means for producing an interrogate signal and wherein the selecting means includes means for supplying the interrogate signal to the selected digitizer, the digitizer sending a start pulse, a sequence of information pulses and a stop pulse only after it has received an interrogation signal.

18. A digital data system as in claim 16 wherein the start, information and stop pulses supplied by each digitizer are all substantially identical and are compatible in form.

19. In apparatus of the character described, a sensing instrument, the sensing instrument having a rotatable member, the rotatable member carrying a reflecting surface, a mounting member, a lamp mounted on the mounting member and carried thereby, a photocell mounted on the mounting member, means for rotating the mounting member so that it travels on an axis substantially coincident with the axis of the rotatable member of the instrument so that upon each rotation of the rotatable mounting member the lamp shines light onto the reflecting surface and light from the reflecting surface is received by the photocell, and circuitry connected to the photocell for generating a pulse when light is received by the photocell.

20. Apparatus as in claim 19 together with commutator means associated with the mounting member for producing a start pulse in a predetermined position of the mounting member with respect to the commutator means and for thereafter producing information pulses indicating the angular position of the rotatable member.

21. In apparatus of the character described, a sensing instrument having a rotating shaft, a plurality of reflecting surfaces carried by the rotating shaft, a stationary mounting member, a lamp mounted on the stationary mounting member, a photocell mounted on the stationary mounting member, the photocell and lamp being positioned so that light from the lamp is adapted to shine on the reflecting surfaces and light reflected from the reflecting surfaces is adapted to be received by the photocell, circuitry connected to the photocell for generating a pulse each time it receives reflected light from one of the reflecting surfaces, and a precision time base generating electrical pulses separated by a predetermined interval of time.

22. In a digitizer for digitizing a physical output adapted for use with a sensing instrument of the type having a movable element mounted on the frame, means carrying at least one reflecting surface adapted to be secured to the movable element, a lamp for directing light onto the reflecting surface, a photoelectric cell for receiving light from the reflecting surface, circuit means for generating a start pulse, means for generating a plurality of information pulses representing by their number the physical output of the digitizing apparatus, means for preventing transmission of the information pulses prior to the generation of a start pulse, and means for generating a stop pulse to prevent further interpretation of information pulses, the time between the start pulse and the stop pulse providing a precision time base related to the information pulses.

23. In a digital data system, a sensing instrument, the sensing instrument including a frame having a rotatable member mounted thereon, at least one reflecting surface mounted on the rotatable member, a mounting member rotatably mounted on said frame, a lamp mounted on the mounting member for shining light onto the reflecting surface, photosensitive means mounted on the mounting member for receiving reflected light from the reflecting surface, said circuitry including means for producing a start pulse when the mounting member reaches a given angular position and thereafter produces a plurality of information pulses as the mounting member is rotated in the same direction beyond the given angular position and terminating the interpretation of the information pulses when the photosensitive means receives light from the reflecting surface.

24. In a digital data system, a sensing instrument, the sensing instrument including a frame having a rotatable member mounted thereon, a plurality of spaced apart reflecting surfaces mounted on the rotatable member, a mounting member mounted in a fixed position on said frame, a lamp mounted on the mounting member for shining light onto the reflecting surfaces, photosensitive means mounted on the mounting member for receiving reflected light from the reflecting surfaces, and circuitry connected to the photocell, said circuitry including means for generating a start pulse and for generating a stop pulse a predetermined time after the start pulse has been generated.

References Cited by the Examiner

UNITED STATES PATENTS

| | | | |
|---|---|---|---|
| 1,369,764 | 2/1921 | Van der Biji | 235—61.11 |
| 2,613,127 | 10/1952 | Geiser | 324—97 |
| 2,680,240 | 6/1954 | Greenfield | 340—150 |
| 2,717,987 | 9/1955 | Hagen | 235—92 |
| 2,881,416 | 4/1959 | Hosken | 235—154 |
| 2,883,649 | 4/1959 | King | 324—97 |
| 3,029,414 | 4/1962 | Schrimpf | 340—172.5 |
| 3,039,686 | 6/1962 | Bell et al. | 235—151 |
| 3,055,585 | 9/1962 | Bell et al. | 235—151 |
| 3,061,192 | 10/1962 | Terzian | 235—157 X |
| 3,145,374 | 8/1964 | Benner et al. | 340—183 |

MALCOLM A. MORRISON, *Primary Examiner.*

WALTER W. BURNS, Jr., *Examiner.*

K. R. STEVENS, K. W. DOBYNS, *Assistant Examiners.*